United States Patent
Murthy et al.

(10) Patent No.: US 11,228,646 B2
(45) Date of Patent: Jan. 18, 2022

(54) SYSTEMS AND METHODS FOR GENERATING, DEPLOYING, AND MANAGING DATA INFRASTRUCTURE STACKS

(71) Applicant: DataCoral, Inc., San Francisco, CA (US)

(72) Inventors: Raghotham Murthy, San Francisco, CA (US); Madhu Meethale Mallisseri, Bangalore (IN); Raveendra Bhat, Bangalore (IN); Vinesh Gudla, South San Francisco, CA (US)

(73) Assignee: Datacoral, Inc., San Francisco, CA (US)

( * ) Notice: Subject to any disclaimer, the term of this patent is extended or adjusted under 35 U.S.C. 154(b) by 274 days.

(21) Appl. No.: 15/667,404

(22) Filed: Aug. 2, 2017

(65) Prior Publication Data
US 2019/0045008 A1    Feb. 7, 2019

(51) Int. Cl.
| | |
|---|---|
| *H04L 29/08* | (2006.01) |
| *G06F 9/455* | (2018.01) |
| *H04L 29/06* | (2006.01) |
| *G06F 16/21* | (2019.01) |

(52) U.S. Cl.
CPC ...... *H04L 67/1097* (2013.01); *G06F 9/45558* (2013.01); *G06F 16/212* (2019.01); *H04L 63/0428* (2013.01); *H04L 67/10* (2013.01); *H04L 67/20* (2013.01); *G06F 9/45516* (2013.01); *G06F 2009/45562* (2013.01)

(58) Field of Classification Search
None
See application file for complete search history.

(56) References Cited

U.S. PATENT DOCUMENTS

| 9,483,258 | B1 * | 11/2016 | Labat | G06F 9/505 |
|---|---|---|---|---|
| 2013/0103705 | A1 * | 4/2013 | Thomas | G06F 16/86 |
| | | | | 707/756 |
| 2015/0019700 | A1 | 1/2015 | Masterson | |
| 2017/0093651 | A1 * | 3/2017 | Mohammad | H04L 67/00 |
| 2017/0126506 | A1 * | 5/2017 | Padala | H04L 43/08 |

(Continued)

OTHER PUBLICATIONS

International Application No. PCT/US2018/044972, International Search Report and Written Opinion dated Oct. 19, 2018.

*Primary Examiner* — Kevin T Bates
*Assistant Examiner* — Dae Kim
(74) *Attorney, Agent, or Firm* — Ahmann Kloke LLP

(57) ABSTRACT

Generating, by a cloud-based system, a plurality of data infrastructure slices, each of the plurality of data infrastructure slices including a respective service; storing, by the cloud-based system, the plurality of data infrastructure slices; selecting, by the cloud-based server, at least two data infrastructure slices of the plurality of stored data infrastructure slices; generating, by the cloud-based system in response to the selection of the at least two data infrastructure slices of the plurality of data infrastructure slices, a data infrastructure stack comprising the selected stored data infrastructure slices, the data infrastructure stack capable of being executed in different third-party entity accounts of an on-demand cloud-computing platform; and deploying, by the cloud-based system, the data infrastructure stack in a particular third-party entity account of the on-demand cloud-computing platform.

18 Claims, 6 Drawing Sheets

(56) References Cited

U.S. PATENT DOCUMENTS

| | | | |
|---|---|---|---|
| 2017/0147297 A1* | 5/2017 | Krishnamurthy | G06F 8/34 |
| 2017/0187785 A1 | 6/2017 | Johnson | |
| 2017/0324620 A1* | 11/2017 | Ellis | H04L 12/4641 |
| 2018/0225155 A1* | 8/2018 | Watt, Jr. | G06F 9/5083 |
| 2018/0241643 A1* | 8/2018 | Chaganti | G06F 3/061 |
| 2018/0359218 A1* | 12/2018 | Church | H04L 63/0263 |
| 2019/0014023 A1* | 1/2019 | Gupta | G06F 11/3055 |
| 2019/0018671 A1* | 1/2019 | Zhu | H04L 43/04 |
| 2019/0053146 A1* | 2/2019 | Shimojou | G06F 9/5077 |
| 2019/0087244 A1* | 3/2019 | Turner | G06F 11/1438 |
| 2020/0026587 A1* | 1/2020 | Gupta | G06F 9/546 |

\* cited by examiner

SYSTEMS AND METHODS FOR GENERATING, DEPLOYING, AND MANAGING DATA INFRASTRUCTURE STACKS

TECHNICAL FIELD

This disclosure pertains to systems for generating, deploying and managing data infrastructure stacks.

BACKGROUND

Under conventional approaches, data is stored by traditional database systems (e.g., Postgres, MySQL). However, traditional database systems were designed for handling (e.g., storing, creating, reading, updating, deleting, processing, analyzing) transaction data, and they are not capable of handling large amounts of data (e.g., greater than 10 TB). With the rise of "big data," recent solutions have attempted to address the shortcomings of traditional database systems; however, such recent solutions typically require months, or even years, of development time, are difficult to deploy and manage, and do not scale efficiently.

SUMMARY

A claimed solution rooted in computer technology overcomes problems specifically arising in the realm of computer technology. In various embodiments, a computing system is configured to provide a data infrastructure stack that may collect and organize any amount of data, from many different sources, and connect to a large number of analysis and reporting tools (or, "tools"). For example, the data infrastructure stack may gather data from third-party web and mobile apps, and disparate data sources, such as Google Analytics, Zendesk, Salesforce, and/or Jira; process and/or combine data; and harness various tools (e.g., JupyterHub, Metabase).

Various embodiments of the present disclosure include systems, methods, and non-transitory computer readable media configured to generate, by a cloud-based system, a plurality of data infrastructure slices, each of the plurality of data infrastructure slices including a respective service; store, by the cloud-based system, the plurality of data infrastructure slices; select, by the cloud-based server, at least two data infrastructure slices of the plurality of stored data infrastructure slices; generate, by the cloud-based system in response to the selection of the at least two data infrastructure slices of the plurality of data infrastructure slices, a data infrastructure stack comprising the selected stored data infrastructure slices, the data infrastructure stack capable of being executed in different third-party entity accounts of an on-demand cloud-computing platform; and deploy, by the cloud-based system, the data infrastructure stack in a particular third-party entity account of the on-demand cloud-computing platform.

In some embodiments, the at least a portion of the respective services comprise respective microservices.

The plurality of data infrastructure slices may be capable of providing communication with one or more of the other data infrastructure slices of the plurality of data infrastructure slices.

In some embodiments, the plurality of data infrastructure slices includes a first collect slice, the first collect slice capable of receiving, from a first datastore, first data organized according to a first schema associated with the first datastore, the first datastore being to the on-demand cloud-computing platform; transforming the first data according to a second schema associated with a first internal datastore, the first internal datastore being internal to the on-demand cloud-computing platform; and storing the transformed first data in the first internal datastore.

In some embodiments, the plurality of data infrastructure slices includes a second collect slice, the second collect slice capable of receiving, from a second datastore, second data organized according to a third schema associated with the second datastore, the second datastore being external to the on-demand cloud-computing platform; transforming the second data according to the second schema associated with the first internal datastore; and storing the transformed second data in the first internal datastore.

In some embodiments, the plurality of data infrastructure slices includes an organize slice, the organize slice capable of second transforming the first transformed data according to a third schema associated with the second internal datastore; and storing the second transformed data in the second internal datastore.

The plurality of data infrastructure slices may include a harness slice, the harness slice comprising a service capable of triggering execution of a third-party service on the second transformed data.

In some embodiments, the data infrastructure stack deployed in the particular third-party entity account of the on-demand cloud-computing platform is capable of facilitating receipt of first data from a plurality of different external data source systems; transforming the first data to a schema of an internal datastore; and triggering execution of a third-party service on the transformed first data.

In some embodiments, the systems, methods, and non-transitory computer readable media further configured to deploy the data infrastructure stack in a second particular third-party entity account of the on-demand cloud-computing platform, wherein the data infrastructure stack deployed to the second particular third-party entity account of the on-demand cloud-computing platform is capable of facilitating receipt of second data from a plurality of different second external data source systems; transforming the second data to a second schema of a second internal datastore; and triggering execution of a second third-party service on the transformed second data.

In some embodiments, the data infrastructure stack is capable of supporting encryption of the first data and the transformed first data using first encryption keys managed by the particular third-party entity account, and capable of supporting encryption of the second data and the transformed second data using second encryption keys managed by the second particular third-party entity account.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

DETAILED DESCRIPTION

Figure 1:
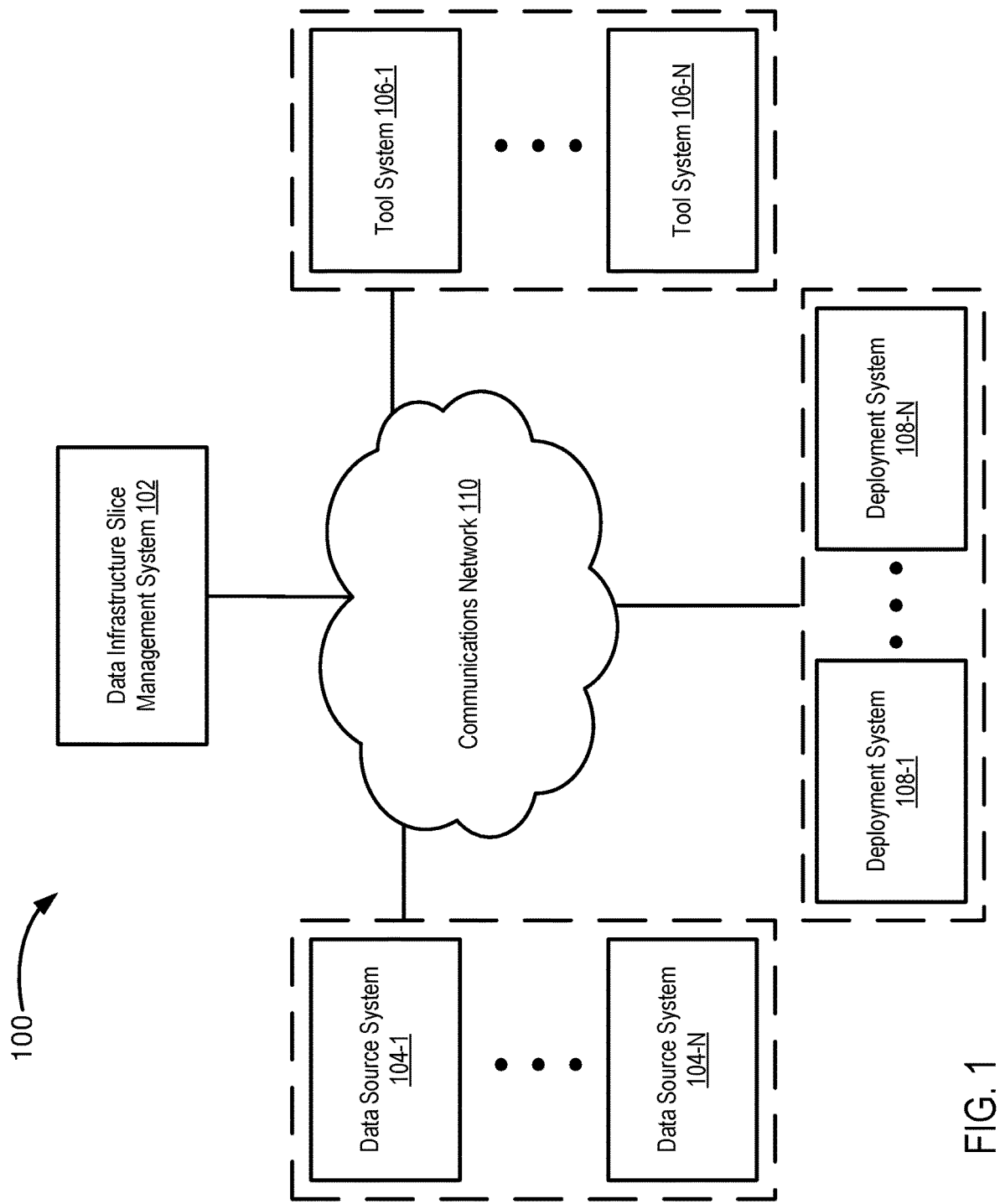
FIG. 1 depicts a diagram of an example system for generating, deploying, and managing data infrastructure stacks according to some embodiments.

Under conventional approaches, users may not utilize new and existing cloud services and functions on data having different schemas and/or different storage sources without creating and customizing a new proprietary infrastructure; however, even if a proprietary infrastructure is created, which may typically take months or years, the proprietary infrastructure does not function to collect different data, transform different data, and harness new and existing services in an end-to-end solution in the cloud. Additionally, proprietary solutions do not scale and may not be efficiently updated and/or re-used.

A claimed solution rooted in computer technology overcomes problems specifically arising in the realm of computer technology. In various embodiments, a computing system is configured to provide a data infrastructure stack that may collect and organize any amount of data, from many different sources, and connect to a large number of analysis and reporting tools (or, "tools"). For example, the data infrastructure stack may gather data from third-party web and mobile apps, and disparate data sources, such as Google Analytics, Zendesk, Salesforce, and/or Jira; process and/or combine data; and harness tools (e.g., JupyterHub, Metabase).

In some embodiments, the data infrastructure stack may be created based on specification requirements. Specification requirements may include but are not limited to the types of associated data source systems, data formats, tools, and/or the like. For example, the specification requirements may indicate data is to be pulled from Postgres databases, stored in S3 and Redshift, and harnessed by JupyterHub.

Unlike traditional solutions, a data infrastructure stack may be generated within a short period of time (e.g., several minutes), and may be deployed within a third-party client entity account (e.g., a client account) of an on-demand and/or "serverless" cloud-computing platform (e.g., AWS, AWS Lambda). For example, rather than custom programming and/or coordinating services, the systems and methods described herein may generate the data infrastructure stack from a set of predefined data infrastructure components (or, "slices"). This may facilitate rapid generation and deployment of data infrastructure stacks, and also allow existing data infrastructure stacks to be easily updated and/or extended (e.g., by adding, updating, and/or removing slices). In some embodiments, the slices and data infrastructure stacks are serverless-native, which may allow, for example, the slices and data infrastructure stacks to auto-scale and/or otherwise achieve improved scalability.

In various embodiments, the data infrastructure stack may be generated by a data infrastructure slice management system associated with a stack provider entity. The data infrastructure stack slice management system may provide data infrastructure stacks to deployment systems associated with third-party client entities (or, "client entities"). The deployment systems, utilizing the data infrastructure stack, may collect and/or transform original data obtained from data source systems associated with third-party data source entities (or, "data source entities"). The deployment systems, utilizing the data infrastructure stack, may organize and/or transform data into one or more data formats. The deployment systems, utilizing the data infrastructure stack, may harness tools for processing (e.g., querying, analyzing) data. The tools may be associated with one or more third-party tool entities (or, "tool entities"). The data source entities, tool entities, and cloud platform provider may all be separate entities, a single entity, or any combination of entities.

In various embodiments, data associated with a data infrastructure stack may be encrypted in motion and/or at rest with keys that only the client entity may use to decrypt the data. Accordingly, the data infrastructure stack, including all of the data, may only be accessed by the client entity, unless specific permissions are granted by the client entity. For example, the client entity may grant permission for the data infrastructure stack slice management system to manage the data infrastructure stack, or portions thereof, without necessarily granting permissions to access any of the data.

FIG. 1 depicts a diagram 100 of an example system for generating, deploying, and managing data infrastructure stacks. In the example of FIG. 1, the system includes a data infrastructure slice management system 102, data source systems 104-1 to 104-N (individually, the data source system 104, collectively, the data source systems 104), tool systems 106-1 to 106-N (individually, the tool system 106, collectively, the tool systems 106), deployment systems 108-1 to 108-N (individually, the deployment system 108, collectively, the deployment systems 108), and a communication network 110.

The data infrastructure slice management system 102 may function to generate, store, and/or manage slices. In various embodiments, functionality of the data infrastructure slice management system 102 may be performed by one or more servers (e.g., a cloud-based server) and/or other computing devices. In some embodiments, a slice may include a service (e.g., microservice) and/or set of services. A service may include one or more functions. As used herein, a function may include an AWS Lambda function (e.g., a predefined AWS Lambda functions, or a function provided to AWS Lambda for execution thereon), or other type of function capable of execution in a cloud-computing environment. Functions may be "serverless" native (e.g., comprised entirely of serverless code, or comprised partially of serverless code).

In some embodiments, slices may include one or more interfaces (e.g., APIs) for communicating with other slices and/or one or more systems (e.g., data source systems, tool systems). For example, a particular slice may include one or more interfaces for communicating with a data source system to obtain original data, and for communicating with another slice for organizing and/or transforming data. The interfaces may be implemented using a custom domain-specific programming language.

In some embodiments, a collect slice may function to gather data from a particular type of data source (e.g., Postgres database) and transform the data into a specific format (e.g., an S3 format), an organize slice may function to organize (e.g., store, transform) the data into a particular format (e.g., Redshift format), and a harness slice may function to harness one or more tool systems (e.g., analytics and/or reporting tool systems) for processing data (e.g., organized and/or transformed data). In some embodiments, slices may be isolated from each other, even within a particular data infrastructure stack. Some or all slices may include one or more atomic services.

In some embodiments, the data infrastructure slice management system 102 may function to generate and/or deploy data infrastructure stacks from previously created, and/or previously defined, slices. For example, a data infrastructure stack may include predefined slices for collecting data, organizing data, and harnessing tools for processing and/or otherwise acting on data (collectively, "acting on data"). For example, acting on data may include querying data, analyzing data, generating reports on data, and so forth. Acting on data may include generating tool data (e.g., data output by a tool system). As used herein, tool data may be treated the same or different as original data. For example, collect slices may perform similar functionality with respect to tool data as original data.

In some embodiments, since slices are predefined and are deployment-target agnostic, data infrastructure stacks may be rapidly generated and/or deployed. For example, if different client entities have the same or similar requirements (e.g., collecting data from Salesforce, storing and/or organizing data in S3 and Redshift, and harnessing JupyterHub), the same data infrastructure stack may be deployed to each of the different client entity deployment systems (e.g., within respective AWS accounts) and achieve the same and/or similar functionality, albeit with different data sets and/or client entity permissions. Similarly, if different client entities have some requirements that are the same or similar, and other requirements that are different, the same portion of the data infrastructure stack (e.g., one or more particular slices) corresponding to the same or similar requirements may be deployed to each of the different client entity deployment systems (e.g., as a portion of a respective data infrastructure stack) and achieve the same and/or similar functionality, albeit with different data sets and/or client entity permissions. For example, a set of slices may be defined and utilized in a data infrastructure stack of one entity and a subset of the same slices may be utilized in a data infrastructure stack (e.g., with other pre-defined or new slices) of another entity.

The data source systems 104 may function to store original data and provide original data to one or more other systems. The data source systems 104 may store different types of original data, such as original data having different data formats. Data formats may refer to data types, file formats, content formats, schemas, and/or the like. In some embodiments, a schema refers to the organization of data as a map of how a datastore is constructed (e.g., divided into database tables in the example of a relational database). A schema may define a set of formulas (e.g., integrity constraints) imposed on a datastore. Integrity constraints may ensure compatibility between various parts of the schema. All constraints may be expressed in the same language. In various embodiments, functionality of the data source system 104 may be performed by one or more servers (e.g., a cloud-based server) and/or other computing devices.

In some embodiments, the data source systems 104 may include various database systems (e.g., Postgres, MySQL), data services (e.g. Sensortower, Second Measure) and/or various platforms that store and/or provide data (e.g., Facebook, Crunchbase, Salesforce). Original data may be stored and/or accessed using different data formats and/or APIs. For example, original data may include transaction data, customer relationship management (CRM) data, and/or the like each of which may be stored by a different data source system 104. Although FIG. 1 depicts each data source system 104 in a box, any or all may be independent of each other. The same may also be true for tool systems 106 and/or deployment systems 108.

In some embodiments, data may be pulled from the data sources systems 104 by a deployed data infrastructure stack, or portion thereof (e.g., by one or more collect slices in the cloud). Data source systems 104 may include systems that are internal and/or external with respect to a third-party entity. For example, an internal data source system 104 may include a system operated and/or controlled by a particular client entity, and an external data source system 104 may include a system that is not operated and/or controlled by the particular client entity.

The tool systems 106 may function to perform various analysis and/or reporting functions. In some embodiments, functionality of the tool systems 106 may be performed by one or more servers (e.g., cloud-based servers) and/or other computing devices. For example, the tool systems 106 may include JupyterHub, Metabase, EMR, and/or the like. The tool systems 106 may be triggered by a deployed data infrastructure stack, or portion thereof (e.g., one or more harness slices).

The deployment systems 108 may each function to execute a data infrastructure stack deployed therein. In various embodiments, functionality of the deployment systems 108 may be performed by one or more servers (e.g., a cloud-based server) and/or other computing devices. In some embodiments, the deployment systems 108 may be implemented by a cloud-computing platform. As used herein, a cloud-computing platform may refer to an on-demand cloud-computing platform (e.g., AWS) and/or "serverless" cloud-computing platform (e.g., AWS Lambda). Each of the deployment systems 108 may be associated with a corresponding client entity account of the cloud-computing platform. This may allow, for example, data infrastructures stacks to be scalable, as well as extensible. It will be appreciated that a "serverless" cloud-computing platform may dynamically manage allocation of computing resources. Accordingly, "serverless" computing may still require servers.

In operation, a deployment system 108 may function to execute corresponding portions of a data infrastructure stack on-demand in order to collect data, organize data, and harness tools for acting on data. A particular collect slice (e.g., an event slice), or group of collect slices, may trigger a data pull from one or more data source systems 104. For example, an event slice may periodically trigger a scheduler function (e.g., every 5 minutes). The scheduler function may determine which collect slices and/or collect functions to trigger. If there are different types of data within a particular data source 104, multiple corresponding slices and/or functions may be triggered. The slices and/or functions may connect to the data source system 104, pull the original data, transform the original data, and store the original and transformed data to a datastore (e.g., an S3 datastore of the deployment system 108) in an appropriate directory location. In some embodiments, whenever new data is written to the datastore directory location, the system generates an event which triggers a loader function (e.g., a Redshift loader function) of an organize slice of the data infrastructure stack. The organize slice may execute the Redshift loader function and execute a command (e.g., a copy command) to load the data to another datastore (e.g., a Redshift datastore of the deployment system 108).

In some embodiments, data from different data source systems 104, and/or data having different data formats within the same or different data source systems 104, may be pulled at different times (e.g., based on different schedules). One or more scheduler functions may pull data based the data source system 104, data format, and/or the like. For example, transaction data may be pulled every 5 minutes, and CRM data may be pulled every 20 minutes.

The communications network 110 may represent one or more computer networks (e.g., LAN, WAN, or the like) or other transmission mediums. The communication network 110 may provide communication between systems 102-108 and/or other systems described herein. In some embodiments, the communication network 110 includes one or more computing devices, routers, cables, buses, and/or other network topologies (e.g., mesh, and the like). In some embodiments, the communication network 110 may be wired and/or wireless. In various embodiments, the communication network 110 may include the Internet, one or more wide area networks (WANs) or local area networks (LANs), one or more networks that may be public, private, IP-based, non-IP based, and so forth.

Figure 2:
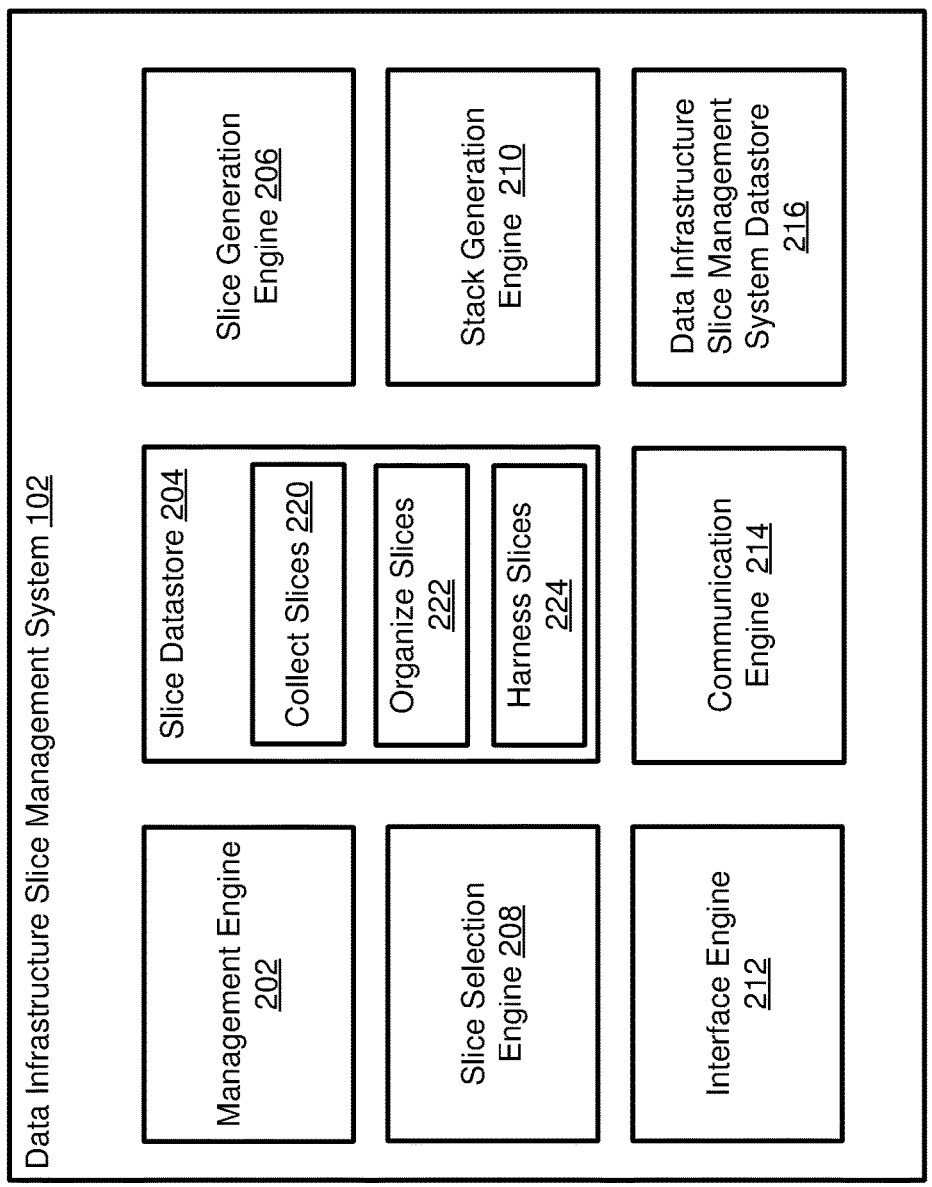
FIG. 2 depicts a diagram of an example of a data infrastructure slice management system according to some embodiments.

FIG. 2 depicts a diagram 200 of an example of a data infrastructure slice management system 102 according to some embodiments. In the example of the FIG. 2, the data infrastructure slice management system 102 includes a management engine 202, a slice datastore 204, a slice generation engine 206, a slice selection engine 208, a stack generation engine 210, an interface engine 212, a communication engine 214, and a data infrastructure slice management system datastore 216.

The management engine 202 may function to manage (e.g., create, read, update, delete, or otherwise access) slices (e.g., collect slices 220, organize slices 222, harness slices 224) stored in the slice datastore 204. The management engine 202 may perform any of these operations manually (e.g., by a user interacting with a GUI) and/or automatically (e.g., triggered by one or more of the engines 206-214, discussed herein). In some embodiments, the management engine 202 includes a library of executable instructions, which are executable by one or more processors for performing any of the aforementioned management operations. Like other engines described herein, functionality of the management engine 202 may be included in one or more other engines (e.g., engines 206-214).

The collect slices 220 may include one or more functions, attributes, and/or parameters for collecting and/or transforming data. For example, collect slices 220 may fetch original data from internal and/or external data source systems, tools systems, and/or the like. The collect slices may transform the original data and/or store that original data and/or transformed data. Transforming may include converting original data having one or more particular data formats (e.g., Postgres) to transformed data having one or more other data formats (e.g., S3), and/or converting transformed data having one or more different data formats (e.g., S3) to transformed data having one or more different data formats (e.g., Redshift). In some embodiments, the collect slices 220 may transform original data, and store the original data and the transformed data in an S3 bucket directory structure. The original data may be transformed in order to make it loadable for a particular format (e.g., S3, Redshift).

In some embodiments, a collect slice 220 includes a function. The function may take static and/or dynamic input parameters. Static input parameters may include connection strings and/or credentials to connect to the corresponding data source system to pull, and/or otherwise obtain, data. Dynamic input parameters may be used for advanced features (e.g., pagination, fanout).

In various embodiments, the static input parameters do not change between different invocations of the collect slice 220. The static input parameters may be inserted when deploying the collect slice 220 (e.g., into a datastore associated with the corresponding deployment system). The static input parameters may be manually and/or automatically entered. In some embodiments, static input parameters may be inferred from the data source system itself. For example, a bootstrap process may be executed as part of the deployment. The bootstrap process may execute in a separate function as part of secure operation mode.

In some embodiments, particular collect slices may include event slices. Event slices may trigger other collect slices 220 to obtain data. For example, an event slice may include a scheduler function to obtain data at predetermined intervals. The event slices may also update and/or refresh data. For example, the event slices may function to cause a particular collect slice 220 to obtain original data from a data source system every hour.

In some embodiments, a collect slice 220 may include some or all of the following:
Collect Slice ID: identifies the collect slice
Function(s): one or more functions (e.g., microservices) of the collect slice
Input Parameters
Computing Resources: computing resources, and/or identifiers thereof, associated with the collect slice (e.g., S3, Redshift)
Description: description of the collect slice—this may be searchable.

In some embodiments, an organize slice 222 includes one or more functions, attributes and/or parameters for organizing data that may be harnessed. For example, an organize slice 222 may include some or all of the following:
Organize Slice ID: identifies the organize slice
Function(s): one or more functions of the organize slice
Format(s): Data format(s) associated with the organize slice. For example, a Redshift schema
Computing Resource(s): computing resource(s) associated with the organize slice (e.g., S3, Redshift)
Description: description of the organize slice. This may be searchable.

In some embodiments, a harness slice 224 includes one or more functions, attributes and/or parameters for harnessing tools for acting on data (e.g., organized data). In some embodiments, a harness slice 224 may include or incorporate services provided by one or more third-party systems (e.g., tool systems 106). It will be appreciated that a harness slice 224, in some embodiments, may include calls (e.g., API calls) to services and/or code provided by third-party systems. For example, a harness slice 224 may include the JupyterHub code itself and/or calls to a JupyterHub service provided by a third-party system. Similarly, in some embodiments, the harness slice 224 may include and/or incorporate services provided by any party (e.g., even the creator or user of the harness slice 224). It will be appreciated that a harness slice 224, in some embodiments, may include calls (e.g., API calls) to services and/or code provided by any such party.

For example, a harness slice 224 may include some or all of the following:
Harness Slice ID: identifies the harness slice
Function(s): one or more functions of the harness slice. For example, the one or more functions may be included in the harness slice and/or trigger one or more associated tool systems. In some embodiments, one or more tools systems may be implemented within the harness slice.

Resource(s): one or more computing resources of the harness slice. For example, the one or more resources (e.g., a database) may be included in the harness slice and/or otherwise accessed (e.g., via API calls) by the harness slice.

Format: Required data format for harnessing (e.g., Redshift)

Description: description of the harness slice—this may be searchable.

The slice generation engine 206 may function to generate (e.g., create, read, update, delete) collect slices 220, organize slices 222, and/or harness slices 224. The slice generation engine 206 may generate slices 220-224 based on predefined functions, and/or the slice generation engine 206 may define new functions (e.g., responsive to user input) and generate slices 220-224 from the new functions. Slices 220-224 may be generated to include some or all of the corresponding information described above. In some embodiments, slices 220-224 may be generated using a custom domain-specific programming language, which may allow, for example, the slice generation engine 206 to efficiently and/or accurately generate slices 220-224 that are compatible with each other and/or various deployment targets.

The slice selection engine 208 may function to select one or more slices 220-224 for a data infrastructure stack. In some embodiments, the slice selection engine 208 may select one or more slices 220-224 based on user input and/or specification requirements (e.g., obtained from a specification requirements data message). For example, the user input may include slice identifiers. Specification requirements may include the types of associates data source systems, data formats, tool systems, and/or the like. For example, the specification requirements may indicate data is to be pulled from Postgres databases, stored in S3 and Redshift, and harnessed by JupyterHub.

The stack generation engine 210 may function to generate the data infrastructure stack. In some embodiments, a data infrastructure stack may include a set of one or more collect slices 220, one or more organize slices 222, and one or more harness slices 224. The stack generation engine 210 may generate the data infrastructure stack in response to a completed selection of slices. In some embodiments, a data infrastructure stack may refer to a particular set of slices, and a data infrastructure stack instance (or, "deployment") may refer to a particular deployed data infrastructure stack and associated data.

In some embodiments, some or all of the functionality of the stack generation engine 210 may be performed by one or more other systems (e.g., deployment systems 108). For example, the slice management system 102 may provide selected slices to a deployment system 108, and the deployment system 108 may generate the data infrastructure stack from the selected slices (e.g., within a customer's AWS account).

The interface engine 212 may function to receive input, present information, and provide information. For example, the deployment interface engine 212 may receive input for generating slices (e.g., slice definitions), receive input for selecting slices (e.g., specification requirements, slice descriptions, and/or slice identifiers), present a user interface (e.g., a GUI) for receiving input and presenting information (e.g., a graphical user interface for generating, selecting, and/or otherwise providing information regarding the slices), and provide data infrastructure stacks (e.g., to a deployment system 108).

In some embodiments, the interface engine 212 functions to facilitate management of deployed data infrastructure stacks. For example, the interface engine 212 may allow an administrator to manage a data infrastructure stack using client entity encryption keys based on one or more cross-account rules. For example, the cross-account rules may define access permissions set by the client entity, thereby ensuring control of the deployed data infrastructure stack remains with the client entity.

The communication engine 214 may function to send requests, transmit and, receive communications, and/or otherwise provide communication with one or a plurality of systems. In some embodiments, the communication engine 214 functions to encrypt and decrypt communications. The communication engine 214 may function to send requests to and receive data from a system (e.g., data sources systems 104, tools systems 106, deployment systems 108) through a network or a portion of a network. Depending upon implementation-specific considerations, the communication engine 214 may send requests and receive data through a connection, all or a portion of which may be a wireless connection. The communication engine 214 may request and receive messages, and/or other communications from associated systems. Communications may be stored in the data infrastructure slice management system 216.

Figure 3:
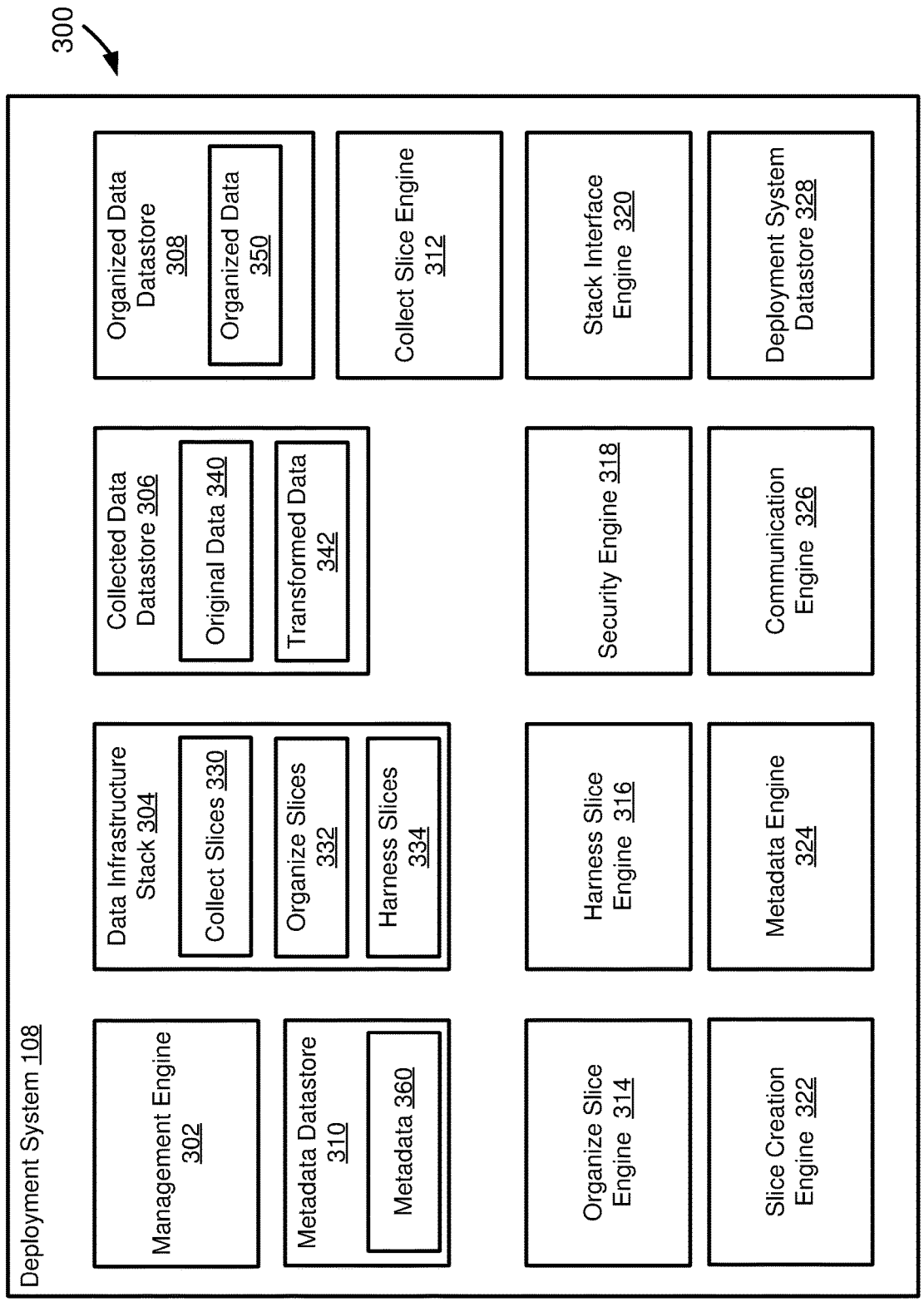
FIG. 3 depicts a diagram of an example of a deployment system according to some embodiments.

FIG. 3 depicts a diagram 300 of an example of a deployment system 108 according to some embodiments. In the example of FIG. 3, the deployment system 108 includes a management engine 302, a data infrastructure stack 304, a collected data datastore 306, an organized data datastore 308, a metadata datastore 310, a collect slice engine 312, an organize slice engine 314, a harness slice engine 316, a security engine 318, a data infrastructure stack interface engine 320, a slice creation engine 322, a metadata engine 324, a communication engine 326, and a deployment system datastore 328.

The management engine 302 may function to manage (e.g., create, read, update, delete, or otherwise access) slices (e.g., collect slices 330, organize slices 332, harness slices 334) of the data infrastructure stack 304, original data 340 and transformed data 342 of the collected data datastore 306, organized data 350 of the organized data datastore 308), and/or the metadata 360 of the metadata datastore 310. The management engine 302 may perform any of these operations manually (e.g., by a user interacting with a GUI) and/or automatically (e.g., triggered by one or more of the engines 312-326, discussed herein). In some embodiments, the management engine 202 includes a library of executable instructions, which are executable by one or more processors for performing any of the aforementioned management operations. Like other engines described herein, functionality of the management engine 302 may be included in one or more other engines (e.g., engines 312-326).

The data infrastructure stack 304 may include a set of selected collect slices 330, organize slices 332, and harness slices 334. In some embodiments, the data infrastructure stack 330 may also include other functionality, resources, and/or data. For example, the data infrastructure stack 304 may include the functionality, resources, and/or data of some or all of the engines 302 and 312-316, and/or the datastores 306-310.

The original data 340 may include data formatted according to an origin data format (e.g., a schema associated with a data source system 104). In some examples, original data may include tabular schema formatted data, object-oriented schema formatted data, and/or the like. For example, original data may include data retrieved from database systems, data services, and/or the like. In some embodiments, the original data 340 may mirror original data of the originating system. In order to maintain an update-to-date mirror, the original data 340 may refreshed periodically. As described elsewhere herein, tool data may be treated the same or similarly as original data.

The transformed data 342 may comprise data that has been transformed any number of times. For example, the transformed data 342 may include original data 340 that has been transformed to a particular target format (e.g., S3, Redshift). Similarly, the transformed data may include previously transformed data that has been subsequently transformed (e.g., original data that is transformed to an S3 data format and subsequently transformed to a Redshift data format). In some embodiments, transformed data 342 includes original data 340 that has been transformed to a specific data format (e.g., S3), which may allow, for example, original data 340 to be obtained from disparate data source systems and maintained in a datastore with a specific format (e.g., S3).

The organized data 350 may include transformed data organized and/or managed according to a particular data format (e.g., one or more Redshift data formats). In some embodiments, the organized data may be organized and/or managed for harnessing by a particular set of harness slices 224 or tools. For example, the organized data datastore 308 may include a managed Redshift datastore, and the organized data 350 may include Redshift formatted data.

The metadata 360 may include metadata associated with any of the data infrastructure stack 304, slices 330-334, and data 340-350. For example, metadata 360 may identify a source of data, format of data, provenance of data, target for data (e.g., a particular tool system), time information (e.g., timestamps when data was obtained, stored, harnessed), and/or the like. In some embodiments, like the other data described herein, the metadata 360 may be stored in a distinct datastore (e.g., in metadata datastore 310, as shown), and/or it may be stored elsewhere (e.g., within the data infrastructure stack 304 itself).

The collect slice engine 312 may function to trigger and/or execute collect slices 330. For example, the collect slices engine 312 may obtain original data 340, store original data 340, transform original data 340 into transformed data 342, store transformed data 342, and/or the like. The collect slice engine 312 may implement the functionality of the executed collect slice 330, and/or the collect slice engine 312 may be implemented within the collect slice 330 of the data infrastructure stack 304. The collect slice engine 312 may function to execute a set of collect slices 330 (e.g., serially and/or in parallel).

The organize slice engine 314 may function to trigger and/or execute organize slices 332. For example, the organize slices engine 314 may obtain and/or load original data 340 and/or transformed data 342, transform/organize original data 340 and/or transformed data 342 into organized data 350, store organized data 342, and/or the like. The organize slice engine 314 may implement the functionality of the executed organize slices 332, and/or the functionality of organize slice engine 314 may be implemented within the organize slices 332 of the data infrastructure stack 304. The organize slice engine 314 may function to execute a set of organize slices 332 (e.g., serially and/or in parallel).

The harness slice engine 316 may function to trigger and/or execute harness slices 334. For example, the harness slices engine 316 may trigger one or more tool systems to act on organized data 350. The harness slice engine 316 may implement the functionality of the executed harness slices 334, and/or the functionality of harness slice engine 316 may be implemented within the harness slices 334 of the data infrastructure stack 304. The harness slice engine 316 may function to execute a set of harness slices 334 (e.g., serially and/or in parallel).

The security engine 318 may function to encrypt/decrypt data, define and/or enforce permissions, and/or the like. For example, the security engine 318 may encrypt/decrypt data associated with the data infrastructure stack 304 using a set of keys controlled by an associated third-party entity (e.g., the third-party entity associated with the deployment system 108). In some embodiments, the security engine 318 may define and/or execute cross-account permission rules. For example, cross-account permission rules may allow the third-party entity to grant permission for another system (e.g., data infrastructure slice management system 102) to manage some or all of the features of the deployment system 108 and/or data infrastructure stack 304.

In some embodiments, the security engine 318 may anonymize data in order for other systems (e.g., data infrastructure stack slice management system 102) to effectively manage the deployment system 108 and/or data infrastructure stack 304 without accessing the real underlying data. The security engine 108 may anonymize the data on a per session basis, rather than storing a single set of anonymized data. This may help reduce, for example, a likelihood that the underlying data may be "reverse-engineered" or otherwise determined.

The data infrastructure stack interface engine 320 may function to obtain data infrastructure stacks and/or slices (e.g., from data infrastructure slice management system 102). For example, the data infrastructure stack interface engine 320 may receive new data infrastructure stacks, updates to particular slices, new slices, and/or the like.

The slice creation engine 322 may function to create, update, delete, and/or otherwise modify slices 330-334 of the data infrastructure stack 304. This may allow the associated third-party entity to maintain the data infrastructure stack 304 without requiring additional supporting systems and/or services. In some embodiments, the slice creation engine 322 may cooperate with the data infrastructure slice management system 102 and/or portion thereof (e.g., slice generation engine 206) to create, update, delete, and/or otherwise modify slices 330-334.

The metadata engine 324 may function to define, gather, assign and/or analyze metadata 360. For example, the metadata engine 324 may analyze metadata 360 to determine data provenance, and facilitate harnessing of organized data 350 by harness slices 334.

The communication engine 326 may function to send requests, transmit and, receive communications, and/or otherwise provide communication with one or a plurality of systems. In some embodiments, the communication engine 326 functions to encrypt and decrypt communications. The communication engine 326 may function to send requests to and receive data from a system (e.g., data infrastructure stack slice management engine 102, data source systems 104, tool systems 106) through a network or a portion of a network. Depending upon implementation-specific considerations, the communication engine 326 may send requests and receive data through a connection, all or a portion of which may be a wireless connection. The communication engine 326 may request and receive messages, and/or other communications from associated systems. Communications may be stored in the deployment system 328.

Figure 4:
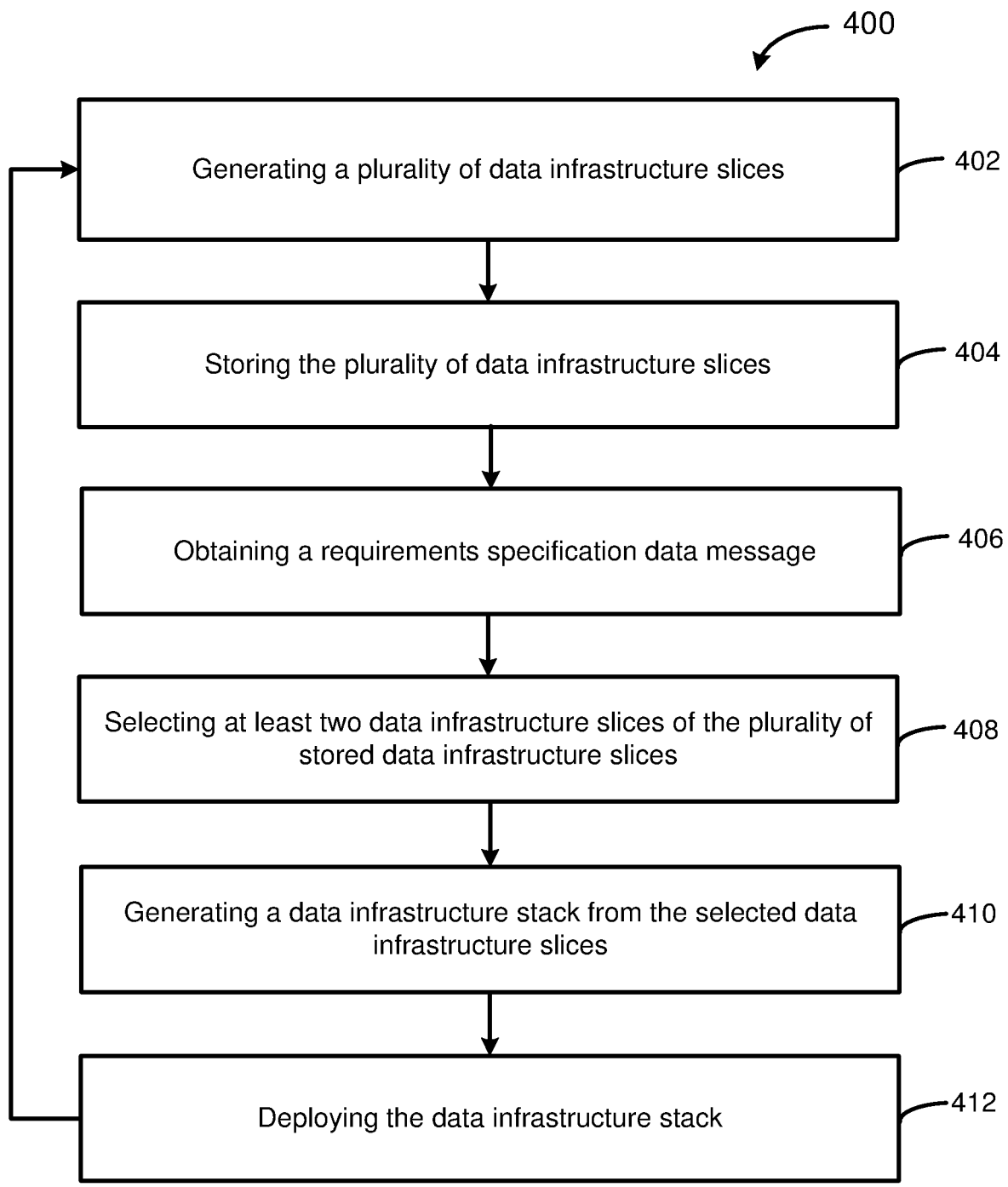
FIG. 4 depicts a flowchart of an example of a method of generating and deploying a data infrastructure stack using a plurality of predefined data infrastructure slices according to some embodiments.

FIG. 4 depicts a flowchart 400 of an example of a method of generating and deploying a data infrastructure stack using a plurality of predefined data infrastructure slices according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, a data infrastructure slice management system (e.g., data infrastructure slice management system 102) generates a plurality of data infrastructure slices (e.g., slices 220-224). Each of the plurality of data infrastructure slices may include a respective service. At least a portion of the respective services may include respective microservices. Each of the plurality of data infrastructure slices may be capable of providing communication with one or more of the other data infrastructure slices of the plurality of data infrastructure slices. For example, a collect slice (e.g., collect slices 220 or 330) may be capable of communicating with an organize slice (e.g., organize slice 222 or 332) and/or vice versa; an organize slice may be capable of communicating with a harness slice (e.g., harness slice 224 or 334) and/or vice versa. In some embodiments, the communication may be enabled by a custom domain-specific programming language used to generate the slices. In some embodiments a slice generation engine (e.g., slice generation engine 206) generates the slices.

In step 404, the data infrastructure slice management system stores the plurality of data infrastructure slices. In some embodiments, a slice datastore (e.g., slice datastore 204) stores the data infrastructure slices.

In step 406, the data infrastructure slice management system obtains one or more requirements specification data messages. For example, the one or more specification requirements data message may include specification requirements, such as the types of associated data source systems, data formats, tools, and/or the like. The specification requirements may indicate data is to be pulled from Postgres databases, stored in S3 and Redshift, and harnessed by JupyterHub.

In some embodiments, a communication engine (e.g., communication engine 214) obtains the one or more requirements specification data messages over a communication network (e.g., communications network 110) from a client entity system (e.g., deployment system 108), and/or a slice selection engine (e.g., slice selection engine 208) receives the one or more requirements specification data messages.

In step 408, the data infrastructure slice management system selects at least two data infrastructure slices of the plurality of stored data infrastructure slices. For example, the data infrastructure slice management system may select one or more collect slices (e.g., collect slices 220), one or more organize slices (e.g., organize slices 222), and one or more harness slices (e.g., harness slices 224). The selection may be based on the one or more requirements specification data messages. In some embodiments, a slice selection engine (e.g., slice selection engine 208) performs the selection.

In some embodiments, selection may be based on the one or more requirements specification data messages and/or other factors. For example, other factors may include data sources, data formats, metadata, and/or the like.

In step 410, the data infrastructure slice management system generates a data infrastructure stack (e.g., data infrastructure stack 304) from the selected stored data infrastructure slices. The data infrastructure stack may be generated in response to the selection of step 408. The data infrastructure stack may include the selected slices. The data infrastructure stack may be capable of being executed in different third-party entity accounts of one or more on-demand cloud-computing platform (e.g., different deployment systems 108). In some embodiments, a stack generation engine (e.g., stack generation engine 210) generates the data infrastructure stack on the data infrastructure slice management system and/or remote system (e.g., deployment system 108).

In step 412, the data infrastructure slice management system deploys the data infrastructure stack. The data infrastructure stack may be deployed in a particular third-party entity account of the on-demand cloud-computing platform. In some embodiments, the data infrastructure stack may be deployed in one or more different third-party entity accounts of one or more on-demand cloud-computing platforms. In some embodiments, an interface engine (e.g., interface engine 212) deploys the data infrastructure stack over the communication network. Any of the steps 402-412 may be repeated in order to, for example, generate and/or deploy the same data infrastructure stack or a different data infrastructure stack to any number of deployment systems.

Figure 5:
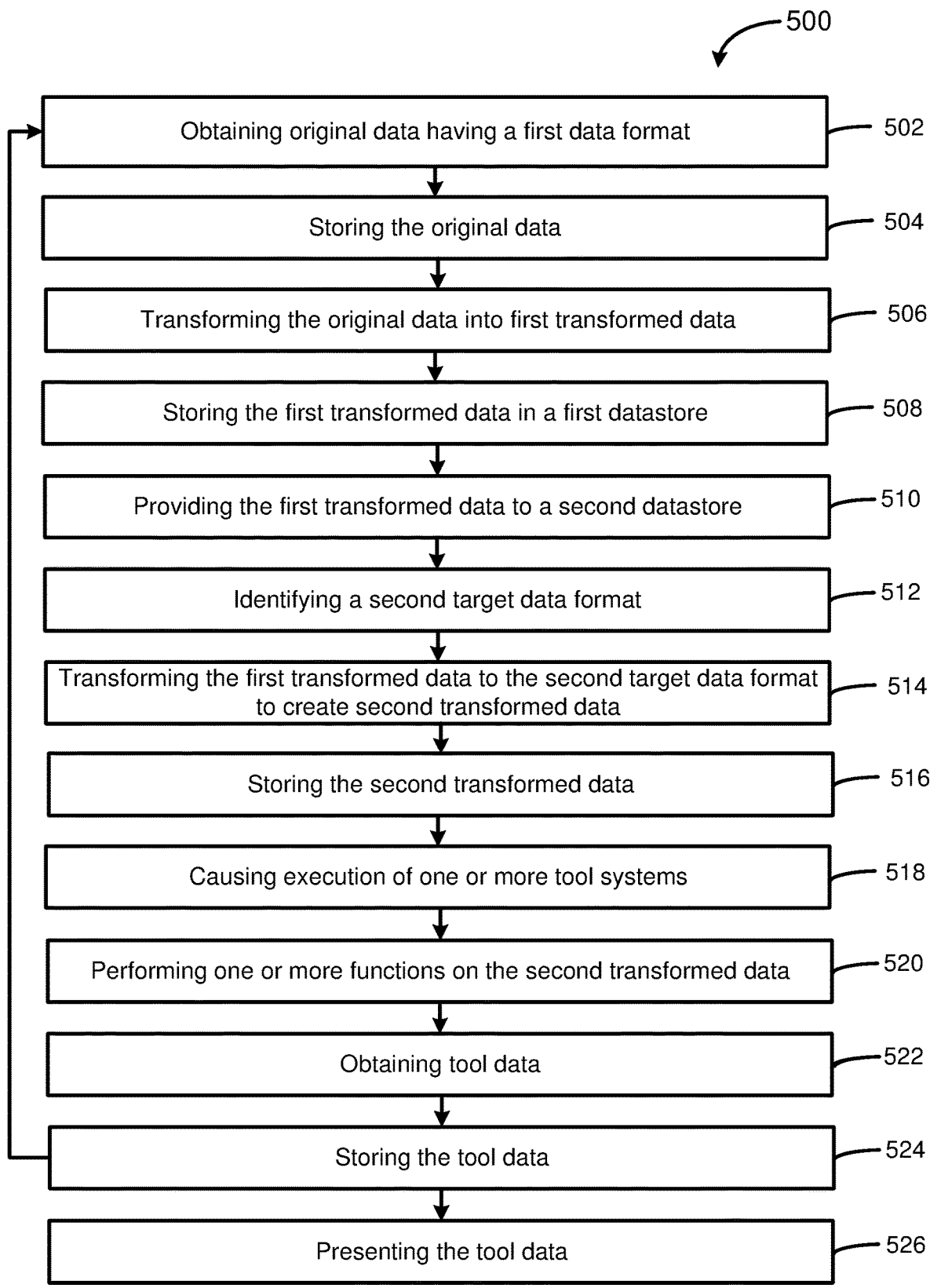
FIG. 5 depicts a flowchart of an example of a method of executing a data infrastructure stack using a plurality of predefined data infrastructure slices according to some embodiments.

FIG. 5 depicts a flowchart 500 of an example of a method of executing a data infrastructure stack using a plurality of predefined data infrastructure slices according to some embodiments. In step 502, a deployment system (e.g., deployment system 108) obtains original data (e.g., original data 340) having a first data format (e.g., a Postgres tabular schema). The original data may be obtained from one or more data source systems (e.g., data source systems 104). For example, the original data may be obtained in response to a schedule function of a collect slice (e.g., a collect slice 330) of a deployed data infrastructure stack (e.g., data infrastructure stack 304). In some embodiments, a collect slice (e.g., a collect slice 330) of the deployed data infrastructure stack obtains the original data over a communication network (e.g., communication network 110).

In step 504, the deployment system stores the original data. In some embodiments, the deployment system stores the original data in a first data store (e.g., collected data datastore 306). Like any of the data stores associated with the deployment system, the first datastore may be internal and/or external to a third-party entity associated with the deployment system. For example, the original data may be stored in an original schema, such as the schema of the data source systems. In some embodiments, a management engine (e.g., management engine 302) stores the original data.

In step 506, the deployment system transforms the original data into first transformed data. The deployment system may transform the original data from the first data format (e.g., an original data format) to a first target data format (e.g., an S3 and/or Redshift data format). In some embodiments, the collect slice engine and/or one or more collect slices transform the data.

In step 508, the deployment system stores the first transformed data (e.g., transformed data 342) in the first datastore. In some embodiments, the management engine and/or one or more collect slices store the transformed data. For example, the one or more collect slices may trigger the management engine to the stored the transformed data.

In step 510, the deployment system provides the first transformed data to a second datastore (e.g., organized data datastore 308). In some embodiments, the collect slices and/or collect slice engine provides the data.

In step 512, the deployment system identifies a second target data format. In some embodiments, the second target data format may be identified based on a required format of one or more harness slices (e.g., harness 234) and/or tool systems (e.g., tool systems 106). For example, if a current data format is S3, and the harness slices and/or tool systems require a Redshift format, the deployment system may identify the Redshift format. In some embodiments, an organize slice engine (e.g., organize slice engine 214) and/or one or more organize slices (e.g., organize slices 232) identifies the second target data format.

In step 514, the deployment system transforms the first transformed data to the second target data format to create second transformed data. For example, the deployment system may transform S3 formatted data to a Redshift data format which may allow and/or support additional querying and/or harnessing than would otherwise be allowed by the prior format. In some embodiments, the organize slice engine and/or organize slices perform the transform.

In step 516, the deployment system stores the second transformed data. For example, the deployment system may store the second transformed data in an organized (or, "managed") Redshift instance. In some embodiments, the organize slice engine and/or one or more organize slices store the data.

In step 518, the deployment system causes execution of one or more tools systems. For example, one or more harness slices may trigger execution of one or more tools systems on the second transformed data. In some embodiments, the harness engine and/or one or more harness slices cause the execution.

In step, 520, the one or more tool systems performs one or more functions on the second transformed data. For example, the one or more tool systems may analyze the second transformed data and generate a corresponding analytics report. The corresponding analytics report may be provided to a user (e.g., client entity, deployment system).

In step 522, the deployment system obtains tool data (e.g., reports, analytics) from the execution of the one or more tools. In some embodiments, the collect engine and/or collect slices obtain the tool data.

In step 524, the deployment system stores the tool data. In some embodiments, the collected data datastore stores the tool data, e.g., in an original and/or transformed data format.

In step 526, the deployment system present at least a portion of the tool data. In some embodiments, a stack interface engine (e.g., stack interface engine 320) presents the tool data. For example, a GUI may present the one or more corresponding analytics reports.

In various embodiments, original and/or transformed data may be refreshed (e.g., to ensure data does not become stale) by obtaining new original data (return to step 502). For example, data may be refreshed based on a schedule (e.g., every 5 minutes, every hour) and/or in response to a trigger event (e.g., an event slice trigger).

Figure 6:
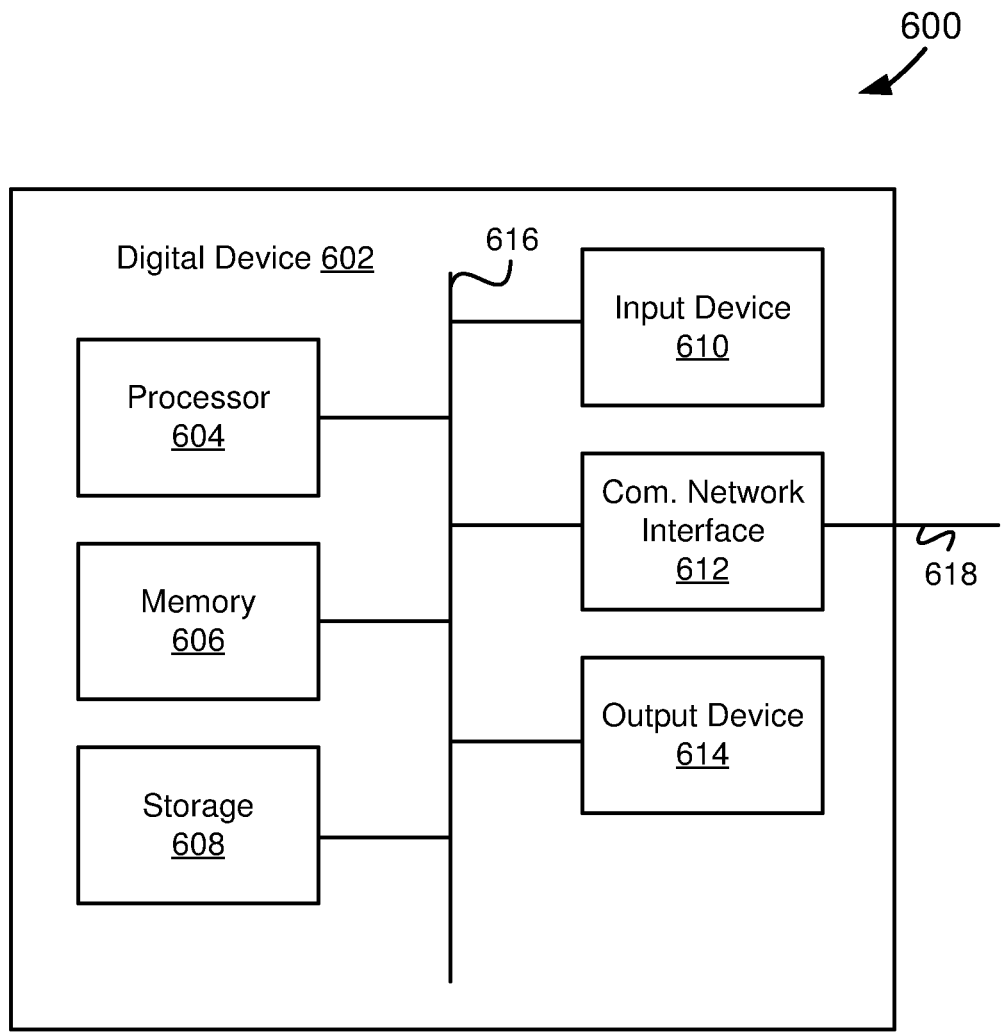
FIG. 6 is a diagram of an example computer system for implementing the features disclosed herein.

FIG. 6 depicts a diagram 600 of an example of a computing device 602. Any of the manufacturer systems 102, the user systems 104, the centralized coordinated messaging system 106, the payer systems 108, and the communication network 110 may comprise an instance of one or more computing devices 602. The computing device 602 comprises a processor 604, memory 606, storage 608, an input device 610, a communication network interface 612, and an output device 614 communicatively coupled to a communication channel 616. The processor 604 is configured to execute executable instructions (e.g., programs). In some embodiments, the processor 604 comprises circuitry or any processor capable of processing the executable instructions.

The memory 606 stores data. Some examples of memory 606 include storage devices, such as RAM, ROM, RAM cache, virtual memory, etc. In various embodiments, working data is stored within the memory 606. The data within the memory 606 may be cleared or ultimately transferred to the storage 608.

The storage 608 includes any storage configured to retrieve and store data. Some examples of the storage 608 include flash drives, hard drives, optical drives, cloud storage, and/or magnetic tape. Each of the memory system 606 and the storage system 608 comprises a computer-readable medium, which stores instructions or programs executable by processor 604.

The input device 610 is any device that inputs data (e.g., mouse and keyboard). The output device 614 outputs data (e.g., a speaker or display). It will be appreciated that the storage 608, input device 610, and output device 614 may be optional. For example, the routers/switchers may comprise the processor 604 and memory 606 as well as a device to receive and output data (e.g., the communication network interface 612 and/or the output device 614).

The communication network interface 612 may be coupled to a network (e.g., network 110) via the link 618. The communication network interface 612 may support communication over an Ethernet connection, a serial connection, a parallel connection, and/or an ATA connection. The communication network interface 612 may also support wireless communication (e.g., 802.11 a/b/g/n, WiMax, LTE, WiFi). It will be apparent that the communication network interface 612 may support many wired and wireless standards.

It will be appreciated that the hardware elements of the computing device 602 are not limited to those depicted in FIG. 6. A computing device 602 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 604 and/or a co-processor located on a GPU (i.e., NVidia).

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance.

The datastores described herein may be any suitable structure (e.g., an active database, a relational database, a self-referential database, a table, a matrix, an array, a flat file, a documented-oriented storage system, a non-relational NoSQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

The invention claimed is:

1. A computing system comprising:
one or more processors; and
memory storing instructions that, when executed by the one or more processors, cause the computing system to perform:
generating, by a cloud-based system, a plurality of data infrastructure slices, each of the plurality of data infrastructure slices including a respective service, at least a subset of the plurality of data infrastructure slices being accessed by a first device of a first entity and a second device of a second entity, the first device being remote from the second device, the first entity being different from the second entity, the plurality of data infrastructure slices including a first collect slice;
storing, by the cloud-based system, the plurality of data infrastructure slices;

receiving, from the first device, a first specification message, the first specification message including a first type of external data source to retrieve data from;
receiving, from the second device, a second specification message, the second specification message including a second type of external data source to retrieve data from;
selecting, by the cloud-based system, a first set of data infrastructure slices, the first set of data infrastructure slices including a first data infrastructure slice and second data infrastructure slice of the plurality of stored infrastructure slices, the selection of the first set of data infrastructure slices being based on the first type of external data source;
selecting, by the cloud-based system, a second set of data infrastructure slices, the second set of data infrastructure slices including a third data infrastructure slice and a fourth data infrastructure slice of the plurality of stored infrastructure slices, the selection of the second set of data infrastructure slices being based on the second type of external data source, any one of the first or the second data infrastructure slices being identical to any one of the third or the fourth data infrastructure slices;
generating, by the cloud-based system in response to selections of the first and the second data infrastructure slices of the plurality of data infrastructure slices, a first data infrastructure stack comprising the first and second data infrastructure slices, the first data infrastructure stack capable of being executed in association with a first third-party entity account of a first on-demand cloud-computing platform;
generating, by the cloud-based system in response to selections of the third and fourth data infrastructure slices of the plurality of data infrastructure slices, a second data infrastructure stack comprising the third and fourth data infrastructure slices, the second data infrastructure stack capable of being executed in association with a second third-party entity account of a second on-demand cloud-computing platform, the first collect slice being capable of receiving, from a first datastore, first data organized according to a first schema associated with the first datastore, the first datastore being external to at least one of the first on-demand cloud-computing platform and the second on-demand cloud-computing platform;
deploying, by the cloud-based system, the first data infrastructure stack in the first third-party entity account of the first on-demand cloud-computing platform to process the data from the first external source;
deploying, by the cloud-based system, the second data infrastructure stack in the second third-party entity account of the second on-demand cloud-computing platform to process the data from the second external source;
transforming the first data according to a second schema associated with a first internal datastore, the first internal datastore being internal to one of the first on-demand cloud-computing platform and the second on-demand cloud-computing platform; and
storing the transformed first data in the first internal datastore.

2. The system of claim 1, wherein at least a portion of the respective services comprise respective microservices.

3. The system of claim 1, wherein each of the plurality of data infrastructure slices is capable of providing communication with one or more of the other data infrastructure slices of the plurality of data infrastructure slices.

4. The system of claim 1, wherein the plurality of data infrastructure slices includes a second collect slice, the second collect slice capable of:
receiving, from a second datastore, second data organized according to a third schema associated with the second datastore, the second datastore being external to at least one of the first on-demand cloud-computing platform and the second on-demand cloud-computing platform;
transforming the second data according to the second schema associated with the first internal datastore; and
storing the transformed second data in the first internal datastore.

5. The system of claim 4, wherein the plurality of data infrastructure slices includes an organize slice, the organize slice capable of:
second transforming the first transformed data according to a third schema associated with a second internal datastore; and
storing the second transformed data in the second internal datastore.

6. The system of claim 5, wherein the plurality of data infrastructure slices includes a harness slice, the harness slice comprising a service capable of triggering execution of a third-party service on the second transformed data.

7. The system of claim 1, wherein the first data infrastructure stack deployed in the first third-party entity account of the first on-demand cloud-computing platform is capable of:
facilitating receipt of first data from a plurality of different external data source systems;
transforming the first data to a schema of an internal datastore; and
triggering execution of a third-party service on the transformed first data.

8. The system of claim 7, wherein the second data infrastructure stack deployed to the second third-party entity account of the second on-demand cloud-computing platform is capable of:
facilitating receipt of second data from a plurality of different second external data source systems;
transforming the second data to a second schema of a second internal datastore; and
triggering execution of a second third-party service on the transformed second data.

9. The system of claim 8, wherein the data infrastructure stack is capable of supporting encryption of the first data and the transformed first data using first encryption keys managed by the first third-party entity account, and capable of supporting encryption of the second data and the transformed second data using second encryption keys managed by the second third-party entity account.

10. A method being implemented by a computing system including one or more physical processors and storage media storing machine-readable instructions, the method comprising:
generating, by a cloud-based system, a plurality of data infrastructure slices, each of the plurality of data infrastructure slices including a respective service, at least a subset of the plurality of data infrastructure slices being accessed by a first device of a first entity and a second device from a second entity, the first entity device being remote of the second entity device, the first entity being different from the second entity, the plurality of data infrastructure slices includes a first collect slice;
storing, by the cloud-based system, the plurality of data infrastructure slices;
receiving, from the first device, a first requirements specification message, the first requirements specification message including a first type of external data source to retrieve data from;
receiving, from the second device, a second requirements specification message, the second requirements specification message including a second type of external data source to retrieve data from;
selecting, by the cloud-based system, a first set of data infrastructure slices, the first set of data infrastructure slices including a first data infrastructure slice and second data infrastructure slice of the plurality of stored infrastructure slices, the selection of the first set of data infrastructure slices being based on the first type of external data source;
selecting, by the cloud-based system, a second set of data infrastructure slices, the second set of data infrastructure slices including a third data infrastructure slice and a fourth data infrastructure slice of the plurality of stored infrastructure slices, the selection of the second set of data infrastructure slices being based on the second type of external data source, any one of the first or the second data infrastructure slices being identical to any one of the third or the fourth data infrastructure slices;
generating, by the cloud-based system in response to selections of the first and the second data infrastructure slices of the plurality of data infrastructure slices, a first data infrastructure stack comprising the first and the second data infrastructure slices, the first data infrastructure stack capable of being executed in association with a first third-party entity account of a first on-demand cloud-computing platform;
generating, by the cloud-based system in response to selections of the third and fourth data infrastructure slices of the plurality of data infrastructure slices, a second data infrastructure stack comprising the third and fourth data infrastructure slices, the second data infrastructure stack capable of being executed in association with a second third-party entity account of a second on-demand cloud-computing platform, the first collect slice being capable of receiving, from a first datastore, first data organized according to a first schema associated with the first datastore, the first datastore being external to at least one of the first on-demand cloud-computing platform and the second on-demand cloud-computing platform;
deploying, by the cloud-based system, the first data infrastructure stack in the first third-party entity account of the first on-demand cloud-computing platform to process the data from the first external source;
deploying, by the cloud-based system, the second data infrastructure stack in the second third-party entity account of the second on-demand cloud-computing platform to process the data from the second external source;
transforming the first data according to a second schema associated with a first internal datastore, the first internal datastore being internal to one of the first on-demand cloud-computing platform and the second on-demand cloud-computing platform; and
storing the transformed first data in the first internal datastore.

11. The method of claim 10, wherein at least a portion of the respective services comprise respective microservices.

12. The method of claim 10, wherein each of the plurality of data infrastructure slices is capable of providing communication with one or more of the other data infrastructure slices of the plurality of data infrastructure slices.

13. The method of claim 10, wherein the plurality of data infrastructure slices includes a second collect slice, the second collect slice capable of:
receiving, from a second datastore, second data organized according to a third schema associated with the second datastore, the second datastore being external to at least one of the first on-demand cloud-computing platform and the second on-demand cloud-computing platform;
transforming the second data according to the second schema associated with the first internal datastore; and
storing the transformed second data in the first internal datastore.

14. The method of claim 13, wherein the plurality of data infrastructure slices includes an organize slice, the organize slice capable of:
second transforming the first transformed data according to a third schema associated with a second internal datastore; and
storing the second transformed data in the second internal datastore.

15. The method of claim 14, wherein the plurality of data infrastructure slices includes a harness slice, the harness slice comprising a service capable of triggering execution of a third-party service on the second transformed data.

16. The method of claim 10, wherein the first data infrastructure stack deployed in the first third-party entity account of the first on-demand cloud-computing platform is capable of:
facilitating receipt of first data from a plurality of different data source systems;
transforming the first data to a schema of an internal datastore; and
triggering execution of a third-party service on the transformed first data.

17. The method of claim 16, wherein the second data infrastructure stack deployed to the second third-party entity account of the on-demand cloud-computing platform is capable of:
facilitating receipt of second data from a plurality of different second data source systems;
transforming the second data to a second schema of a second internal datastore; and
triggering execution of a second third-party service on the transformed second data.

18. The method of claim 17, wherein the data infrastructure stack is capable of supporting encryption of the first data and the transformed first data using first encryption keys managed by the first third-party entity account, and capable of supporting encryption of the second data and the transformed second data using second encryption keys managed by the second third-party entity account.

* * * * *